(12) United States Patent
Ye

(10) Patent No.: US 7,933,838 B2
(45) Date of Patent: Apr. 26, 2011

(54) APPARATUS FOR SECURE DIGITAL CONTENT DISTRIBUTION AND METHODS THEREFOR

(75) Inventor: Zhishen Ye, Indianapolis, IN (US)

(73) Assignee: Zhishen Ye, Moorpark, CA (US)

( * ) Notice: Subject to any disclaimer, the term of this patent is extended or adjusted under 35 U.S.C. 154(b) by 1399 days.

(21) Appl. No.: 11/414,011

(22) Filed: Apr. 27, 2006

(65) Prior Publication Data

US 2007/0198416 A1   Aug. 23, 2007

Related U.S. Application Data

(60) Provisional application No. 60/681,936, filed on May 17, 2005.

(51) Int. Cl.
*G06F 21/00* (2006.01)
(52) U.S. Cl. ............... 705/50; 705/51; 705/57; 713/193
(58) Field of Classification Search .................... 705/50, 705/51, 57; 713/193
See application file for complete search history.

(56) References Cited

U.S. PATENT DOCUMENTS

| 6,983,371 | B1 * | 1/2006 | Hurtado et al. | 713/189 |
| 7,590,866 | B2 * | 9/2009 | Hurtado et al. | 713/189 |
| 2002/0099663 | A1 * | 7/2002 | Yoshino et al. | 705/65 |
| 2006/0095792 | A1 * | 5/2006 | Hurtado et al. | 713/189 |

OTHER PUBLICATIONS

"International Preliminary Report on Patentability", mailed Nov. 29, 2007, for Intl App No. PCT/US2006/018390; Filed on May 26, 2006; Applicant: Anames, Inc.
IPCORES, AES1, "Ultra-Compact Advanced Encryption Standard Core", Apr. 2005, pp. 1-6, http://www.ipcores.com/.

* cited by examiner

*Primary Examiner* — Pierre E Elisca

(57) ABSTRACT

A method of transmitting a first digital content file from a first sender device configured with a key library to a receiver device configured with a receiver identity and a first sender-receiver key is disclosed. The method includes identifying the first sender-receiver key within the key library based on the receiver identity. The method also includes encrypting a first digital message, the first digital message including the first digital content file and a code to derive a second sender-receiver key, with the first sender-receiver key. The method further includes transmitting the first digital message to the receiver device; decrypting the first digital message with the first sender-receiver key; deriving the second sender-receiver key based on the code; and replacing the first sender-receiver key with the second sender-receiver key.

24 Claims, 9 Drawing Sheets

APPARATUS FOR SECURE DIGITAL CONTENT DISTRIBUTION AND METHODS THEREFOR

RELATED APPLICATIONS

This application claims the benefit of U.S. Ser. No. 60/681,936, filed on May 17, 2005. All applications incorporated herein by reference and all priorities claimed.

BACKGROUND OF THE INVENTION

The present invention relates in general to personal communication systems. More particularly, the present invention relates to an apparatus for secure digital content distribution and methods therefore.

The Internet has become an efficient mechanism for globally distributing digital content, such as music and movies. However, the advantage of easy digital communication has also allowed the digital content to be easily pirated by just about anyone with a computer and Internet access. The combination of high-speed broadband Internet access, digital content compression software (which reduces the size of digital content files), peer-to-peer file trading networks (which allows users to post content files), and lack of viable digital rights standards, has caused the content owners to lose control of their content. Consequently, content owners are experiencing a loss of potential revenue.

However, many current digital rights management (DRM) techniques have not adequately protected ownership rights in a manner consistent with consumer usability. For example, DIVX was a DRM technique that allowed a consumer to view a digital movie in a specially configured player, once that content has been authorized for play on that player through a phone line. However, since authorization was for a specific player, viewing the same content in another player was problematic, often requiring calling a DIVX service representative in order to change or add an authorized player, often for an additional fee. Consequently, because of the awkward authorization requirements, the consumer was discouraged from purchasing additional content.

Another more commonly used DRM scheme is CSS, or content scrambling system. Introduced around 1996, CSS was intended to protect the content of DVDs from piracy and to enforce region-based viewing restrictions. Typically, CSS key sets are licensed to manufacturers who incorporate them into products such as DVD drives, DVD players and DVD movie releases. However, since CSS uses a relatively weak, proprietary 40-bit encryption stream cipher algorithm, it has since been reverse engineered. Software applications such as DeCSS are now available, allowing commercial DVDs to be freely copied.

Yet another DRM scheme ties the digital content to a specific hardware configuration (e.g., Windows XP, Office XP, etc.). For example, commonly used software product activation generally requires a consumer to use a special activation code in order to register the software application with the software publisher before the application may be (fully) utilized. In generally, the product activation scheme usually involves hashing an activation code with a number that is generated from the hardware's specific configuration (i.e., size of hard drive, processor speed, etc.). However, product activation DRM schemes tend to be relatively easy to bypass.

Yet another DRM scheme is digital watermark, which may be added to the digital content, often hidden from the user, in order to track the source of the digital content. However, since this scheme does not restrict the usage of the digital content, it may offer minimal protection for the copyright owner.

In addition, because exact copies or clones of digital content may be easily made, current DRM schemes are generally unable to distinguish between a legally-obtained copy from its identical illegally-created copies. Consequently, few DRM techniques have been able to prevent criminal copyright infringement and organized piracy.

What is needed is an apparatus for secure digital content distribution and methods therefore.

SUMMARY OF THE INVENTION

The invention relates, in one embodiment, to a method of transmitting a first digital content file from a first sender device configured with a key library to a receiver device configured with a receiver identity and a first sender-receiver key. The method includes identifying the first sender-receiver key within the key library based on the receiver identity. The method also includes encrypting a first digital message, the first digital message including the first digital content file and a code to derive a second sender-receiver key, with the first sender-receiver key. The method further includes transmitting the first digital message to the receiver device; decrypting the first digital message with the first sender-receiver key; deriving the second sender-receiver key based on the code; and replacing the first sender-receiver key with the second sender-receiver key.

The invention relates, in another embodiment, to a method of rendering a digital content file on a rendering device, wherein the digital content file is encrypted with a set of cryptographic media keys. The method includes receiving a first segment of the digital content file on an authorization device. The method also includes decrypting the first segment of the digital content file with at least one cryptographic media key of the set of cryptographic media keys. The method further includes transmitting a first rendering message, including the first segment of the digital content file, to a rendering device; and rendering the first segment of the digital content file substantially in real time on the rendering device.

The invention relates, in another embodiment, to a method of rendering a digital content file on a rendering device coupled to an authorization device. The method includes receiving a first segment of the digital content file. The method also includes decrypting the first segment of the digital content file in the authorization device with a first set of cryptographic media keys. The method further includes encrypting a first rendering message, including the first segment of the digital content file, with a first set of rendering device cryptographic keys; transmitting the first rendering message to the rendering device. The method also includes decrypting the first rendering message with the first set of rendering device cryptographic keys; and rendering the first segment of the digital content file on the rendering device.

The invention relates, in another embodiment, to an apparatus for rendering a digital content file on a rendering device, wherein the digital content file is encrypted with a set of cryptographic media keys. The apparatus includes means of receiving a first segment of the digital content file on an authorization device. The apparatus also includes means of decrypting the first segment of the digital content file with at least one cryptographic media key of the set of cryptographic media keys. The apparatus further includes means of transmitting a first rendering message, including the first segment of the digital content file, to a rendering device; and means of rendering the first segment of the digital content file substantially in real time on the rendering device.

The invention relates, in another embodiment, to an apparatus for rendering a digital content file encrypted with a set of cryptographic media keys on a rendering device coupled to an authorization device, the rendering device including a first set of cryptographic rendering device keys. The apparatus includes means for receiving a first segment of the digital content file on an authorization device. The apparatus also includes means for decrypting the first segment of the digital content file with the set of cryptographic media keys. The apparatus further includes means for encrypting a first rendering message, including the first segment of the digital content file, with the first set of cryptographic rendering device keys, substantially in real time. The apparatus also includes means for transmitting the first rendering message to the rendering device; means for decrypting the first rendering message with the first set of cryptographic rendering device keys; and means for rendering the first segment of the digital content file.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
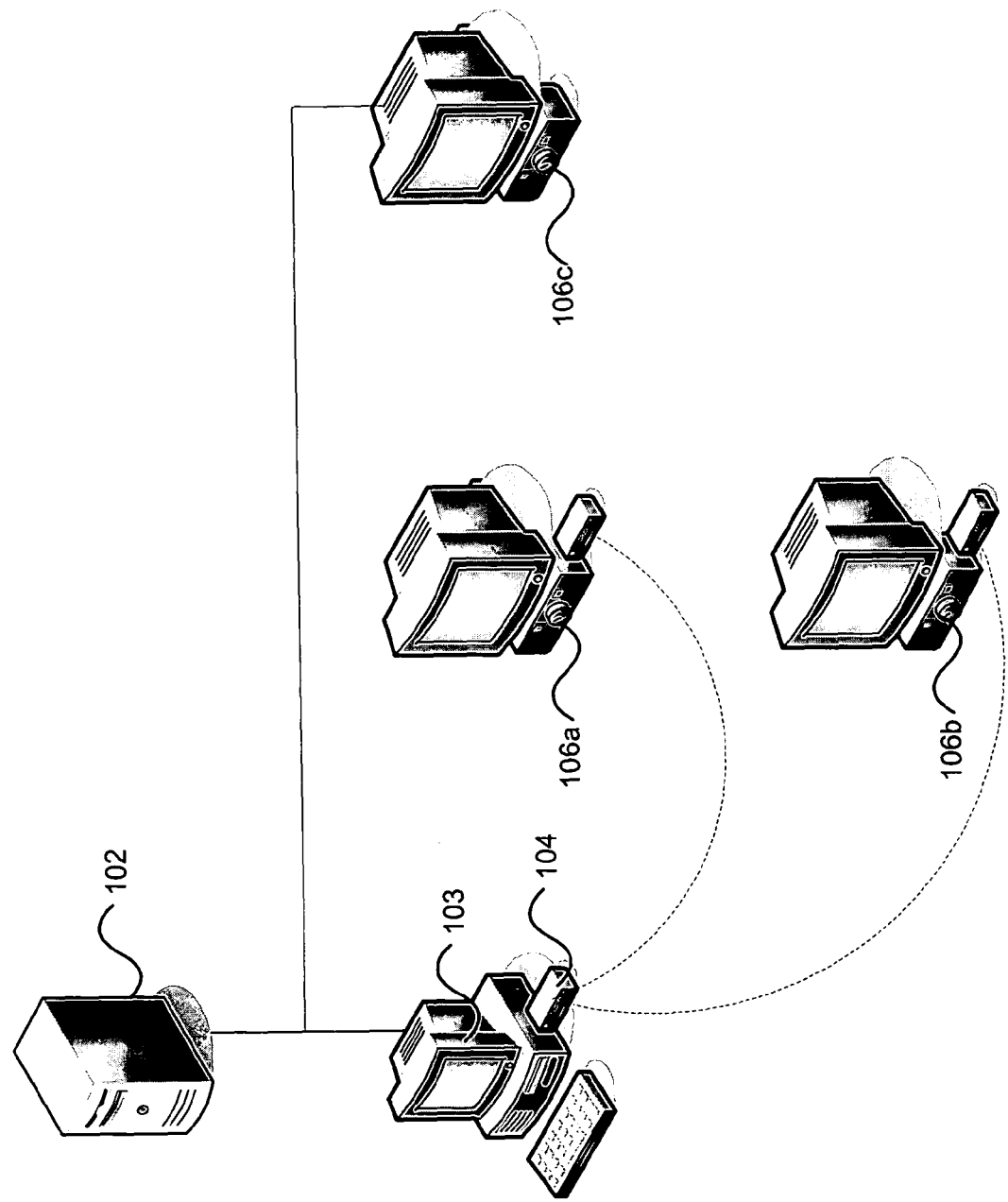
FIG. 1 shows a simplified diagram of a secure digital content distribution architecture, according to an embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

It is believed by the inventor herein that a digital rights management (DRM) scheme may be implemented, such that digital content may be substantially protected by first encrypting the digital content with a digital content key, transmitting the digital content to a local authorization device, sequentially re-encrypting the digital content with a set of rendering device keys, and then sequentially rendering the digital content on the rendering device.

Consequently, since the digital content may be frequently re-encrypted with different rendering device keys, the digital content may be substantially resistant to a cryptanalytic attack. In addition, unlike commonly used DRM schemes, the current invention actually encourages copying in order to facilitate digital content distribution, since the digital content key is kept separate from the digital content itself. In an embodiment, the digital content re-encryption occurs in a substantially tamper resistant device, such as a PCMCIA card or a USB device. In an embodiment, the tamper resistant device includes a PPC (piracy prevention chip). In an embodiment, symmetric key algorithms are used to encrypt data (e.g., the digital content, etc) in this invention.

A PPC is a specially designed ASIC (application specific integrated circuit) that may generate or store cryptographic keys, decrypt a digital content file, and re-encrypt a digital content file substantially in real time. In an embodiment, the PPC includes a CPU/Flash/RAM and encryption/decryption engine that generally allows the encryption and decryption of data on the fly. In an embodiment, the PPC may be configured with a state-of-the-art tamper-resistance design that substantially increases the cost of cryptographic attacks. In an embodiment, the PPC may erase sensitive data (e.g., cryptographic keys, etc.) if either the PPC security encapsulation has been penetrated, or PPC environmental parameters have been modified beyond particular specifications (even after its power supply has been crippled). In an embodiment, particular sensitive data (e.g., digital content keys, etc.) is managed via proper integrated circuit design and programming, such that the PPC does not substantially release the sensitive data.

Cryptanalysis generally involves first determining a pattern in the encrypted data, and then inferring the key that was used to create that pattern. Once the key is known, all subsequent data encrypted with that key may be decrypted. However, if the key is frequently changed, as in the current invention, this attack is frustrated.

Symmetric-key encryption schemes generally involve a single, common key that is used to encrypt and decrypt the message (e.g., digital content, etc.). For example, common symmetric-key encryption schemes include AES (Rijndael), DES, Triple DES, Lucifer, Blowfish, CAST, IDEA, RC5, RC2, etc. In general, symmetric block-ciphering encryption involves dividing a plaintext M (digital content) into blocks of fixed length $M=M_1, M_2 \ldots M_N$. Each message block Mi is encrypted to ciphertext block, which, in turn, is concatenated into the ciphertext message (encrypted digital content). It generally consists of several rounds of operations that scramble the key and the plaintext. The more times this is done, that is the more rounds, the more resistant to cryptanalysis is the ciphertext.

Attacking an appropriate state-of-the-art strong encryption on digital multimedia content, if successful, may cost far beyond the economic value of that content. In an embodiment, the AES, a block cipher adopted as an encryption standard by the US government, is used to encrypt data (e.g., the digital content, etc) in this invention. The design and strength of all key lengths of the AES algorithm (i.e., 128, 192 and 256) are sufficient to protect classified information up to the SECRET level, as announced by the US Government in June 2003.

Referring now to FIG. 1, a simplified diagram of a secure digital content distribution architecture is shown, according to an embodiment of the invention. In an embodiment, the PPC (piracy prevention chip) device 104 (authorization device) has at least a first interface in order to be coupled to PPC server 102 (authorization server) through a computer 103, and a second interface in order to be coupled to a rendering device 106a-c. In an embodiment, the PPC device 104 has a single interface in order to be coupled to both PPC server 102 through a computer 103, and to rendering device 106a-c. In an embodiment, PPC device 104 has a plurality of interfaces.

In an embodiment, PPC (piracy prevention chip) device 104 may be coupled directly to PPC server 102. In an embodiment, at least one of the interfaces is a USB interface. In an embodiment, at least one of the interfaces is a Firewire interface. In an embodiment, at least one of the interfaces is an Ethernet interface. In an embodiment, at least one of the interfaces is a Bluetooth wireless interface. In an embodiment, at least one of the interfaces is an 802.11 wireless interface. In general, PPC device 104 communicates with PPC server 102, in order to obtain proper authorization for the appropriate digital content file (not shown).

In addition, PPC device 104 may also be transferred among several rendering devices, such as rendering device 106a or rendering device 106b. In an embodiment, the rendering device is a DVD player. In an embodiment, the rendering device is a HD DVD player. In an embodiment, the rendering device is a gaming console (e.g., Microsoft XBOX, Sony Play Station, etc.). In an embodiment, the rendering device is a karaoke machine. In an embodiment, the rendering device is a digital music player. In an embodiment, the rendering device is a digital book reader. In an embodiment, the rendering device is a PC. In an embodiment, a PPC is directly embedded into rendering device 106c, that in turn, may be coupled to PPC server 102, as well as PPC device 104.

Figure 2:
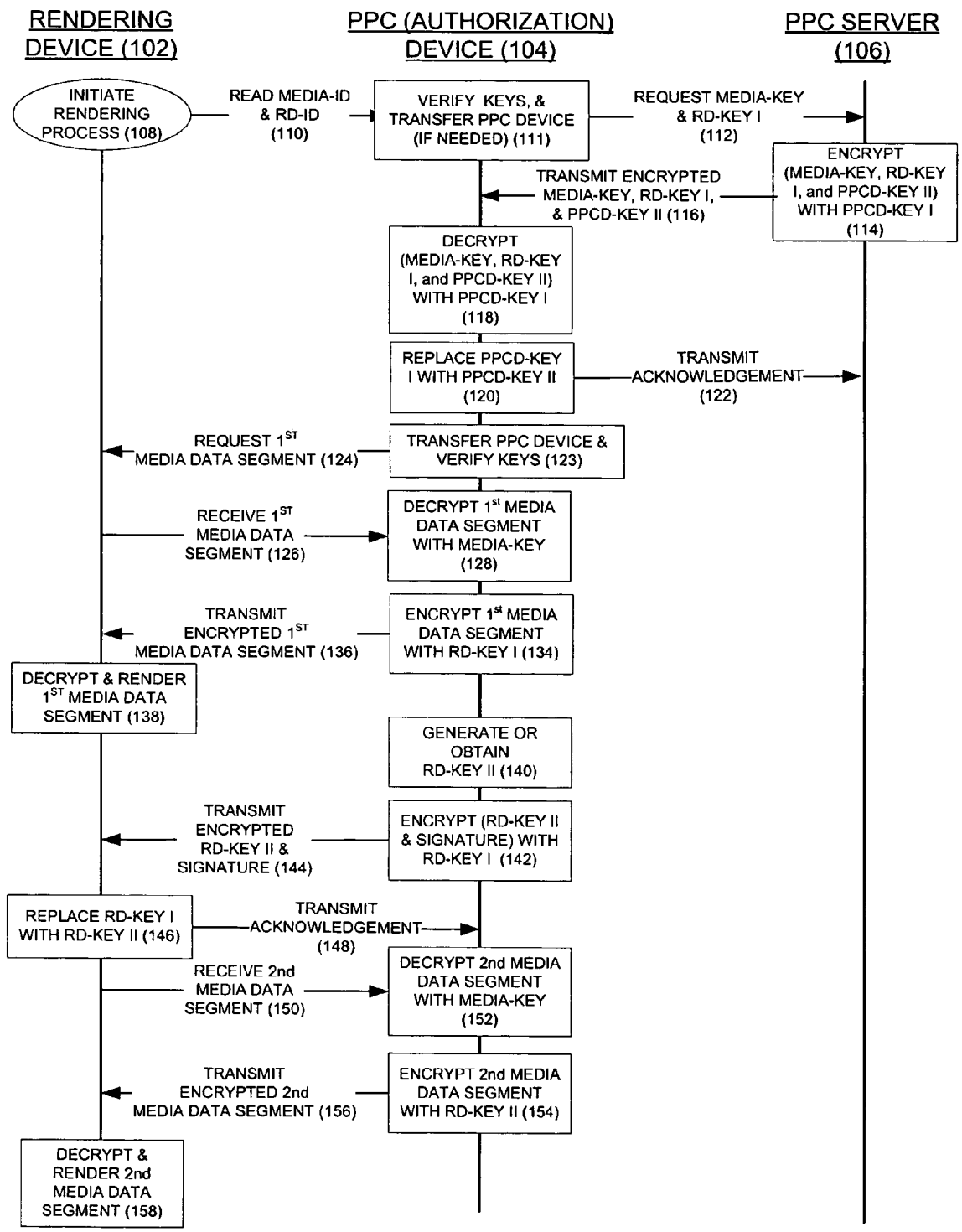
FIG. 2 shows a simplified method of securely distributing digital content, according to an embodiment of the invention.

Referring now to FIG. 2, a simplified method of securely distributing digital content is shown, according to an embodiment of the invention. In a typical configuration, a PPC device is configured to be attached to rendering device 102 in order to enable the digital content file to be securely rendered (e.g., shown, played, heard, etc.), and also to be attached to a PPC server 106 via a computer that is attached to the Internet, in order to obtain proper authorization for the digital content file.

A rendering process 108 may be initiated at rendering device 102 with an attached PPC device 104. For example, a DVD player may be started with a DVD disc inserted. PPC device 104 may then read a digital content media-ID and a rendering device RD-ID at 110. Digital content media-ID is generally a unique identifier assigned to that particular digital content file. It may be irrespective of the physical media upon which it is stored. For example, a particular movie (or a video game, a song, etc) or a particular copy may have a unique media-ID associated with it. RD-ID is generally a unique identifier assigned to a particular rendering device. It may be similar to a MAC address in a network card, and may be used to associate a particular digital media content purchase with a specific rendering device 102.

In addition, media-ID is generally associated with a media-key (e.g., secure symmetric key, etc.) that may be subsequently used by PPC device 104 in order to securely decrypt the digital content file. For example, after having been encrypted with a CSS encryption scheme, a DVD may be further encrypted with a block cipher (e.g., AES, DES, 3-DES, etc.) using the media-key. RD-ID is generally associated with a RD-key (e.g., secure symmetric key, etc) at any given time. The RD-key may be used as an encryption key by PPC device 104 for outgoing data and be used as a decryption key by rendering device 102 for incoming data. The RD-key may be constantly and synchronically updated in both PPC device and rendering device's memories so that the two devices can communicate with each other.

Once the media-ID and RD-ID are read at 110, PPC device 104 may first verify keys inside the device to check whether keys (such as media-key and RD-key) are available. If keys needed are not available inside the device, PPC device 104 may then be transferred from rendering device 102 to a personal computer (not shown) connected to the Internet at 111 in order to communicate with PPC server 106. If the rendering device has been connected to the PPC device before, the rendering device information (e.g. RD-ID, current RD-key, etc) may have been stored in the PPC device. The rendering process can be started directly at 111, and the media-ID (or the title of the particular media associated with the media-ID) can be fed to the PPC device 104 by the user through the computer.

PPC device 104, generally associated with a unique identifier PPCD-ID (PPC Device ID), may then request the media-key for media-ID, and RD-key I (if needed) for RD-ID at 112. RD-keys are generally used to securely encrypt the transmission of digital content segments between PPC device 104 and rendering device 102. That is, a first digital content segment is encrypted with a first RD-key, a second digital content segment is encrypted with a second RD-key, etc.

PPC server 106 then may encrypt the media-key, RD-key I, and PPCD-key II, with PPCD-key I, at 114. PPCD-keys are generally used to securely transmit data between PPC server 106 and PPC device 104. In an advantageous fashion, key chaining or cascading is employed, such that a subsequent key (e.g., PPCD-key II, etc.) is transmitted in the body of a message encrypted with a previous key (e.g., PPCD-key I, etc.).

Encrypted media-key, RD-key I, and PPCD-key II, are then transmitted to PPC device 104 at 116, and decrypted at 118. In general, PPCD-key I has been previously loaded into PPC device 104. PPC device 104 then replaces PPCD-key I for PPCD-key II at 120, and transmits an acknowledgement to PPC server 106 that the exchange has occurred at 122. Consequently, the next transmission between PPC server 106 and PPC device 104 may be encrypted with PPCD-key II.

PPC device 104 may first be transferred back to rendering device 102 from a computer (not shown) connected to PPC server 106, at 123. A first digital media data segment may then be requested from rendering device 102 at 124, and received in encrypted form at 126.

Within the PPC device, the first digital media data segment may then be decrypted with previously received media-key at 128, and subsequently encrypted with RD-key I at 134. In general, RD-key I has been previously loaded into rendering device 102. Encrypted first digital media data segment is then transmitted back to rendering device 102 at 136, where it is consequently decrypted and rendered at 138.

In addition, RD-key II, may be generated or obtained by PPC device 104 at 140, for use in a subsequent digital media data segment transmission. The RD-key II and a signature are then encrypted with RD-key I at 142. Signatures are generally a request for acknowledgement. In this case, the acknowledgement is that a previous RD-key (e.g., RD-key I, etc.) has been replaced with a subsequent RD-key (e.g., RD-key II, etc.).

Encrypted RD-key II and signature are then transmitted to rendering device 102 at 144, at which point RD-key I is replaced with RD-key II at 146. An acknowledgement to the signature is then transmitted to PPC device 104 at 148, signaling to PPC device 104 that RD-key II may be used. Consequently, a second digital media data segment may be received at PPC device 104 at 150, decrypted with media-key at 152, and subsequently encrypted with RD-key II at 154. Encrypted second digital media block may then be transmitted at 156 back to rendering device 102, where it may be decrypted and rendered at 158.

Figure 3A:
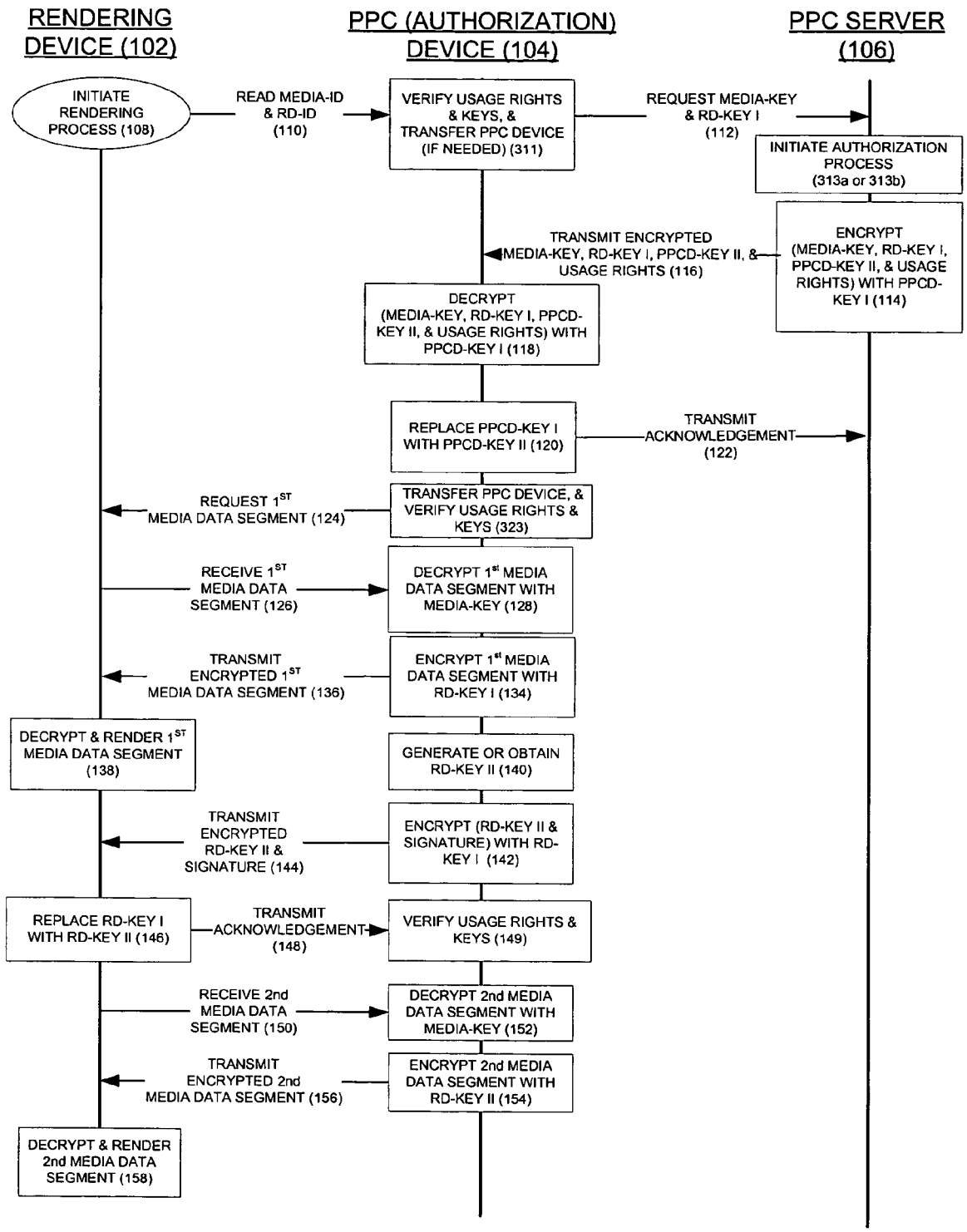
FIGS. 3A-B show a simplified method of securely distributing digital content with authorization verification, according to an embodiment of the invention.
Figure 3B:
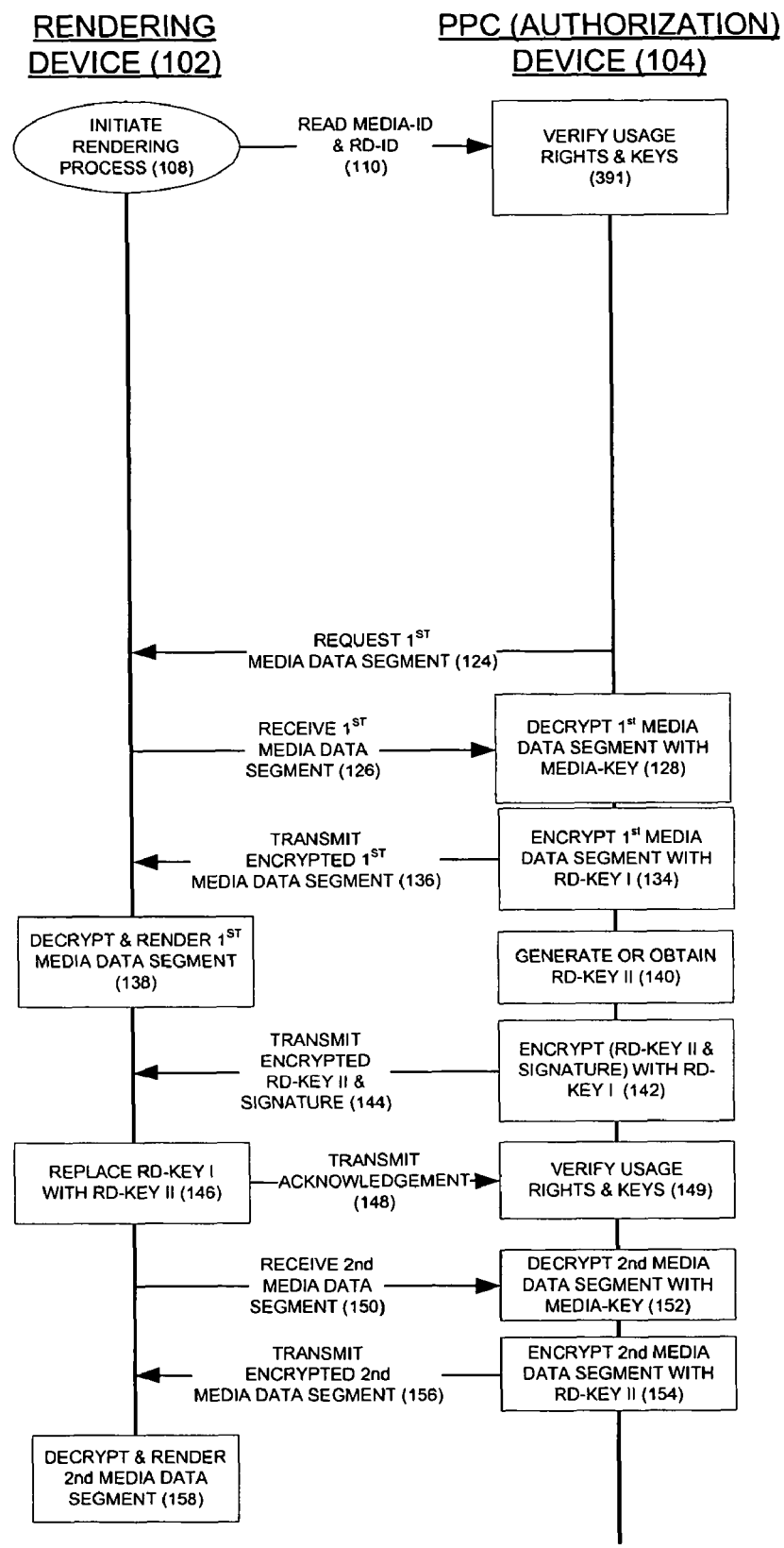

Referring now to FIGS. 3A-B, a simplified set of diagrams for securely distributing digital content with authorization verification is shown, according to an embodiment of the invention. FIG. 3A shows a simplified method of securely distributing digital content with authorization verification and with a PPC server, according to an embodiment of the invention. As before, a rendering process 108 may be initiated at rendering device 102 with an attached PPC device 104. Once the media-ID and RD-ID are read at 110, PPC device 104 may verify usage rights and keys inside the device at 311. If the right to render is expired or not authorized, or keys (such as media-key and RD-key) are not inside the device, PPC device 104 may then be transferred from rendering device 102 and to a personal computer (not shown) connected to the Internet in order to communicate with PPC server 106.

PPC device 104 may then request the media-key, and RD-key I (if needed) at 112. However, before the media-key and RD-key I are transmitted to PPC device 104, an authorization process may be initiated by PPC server 106 at 313a or alternatively at 313b. In general, the owner of the digital media file may have created a set of usage rights and restrictions associated with rendering the digital media file, intending to charge consumers appropriate fees for those rights. For example, user rights may include the right to initially render, the right to render one or several particular media or any media within a particular time frame or window, the right to render any media for a particular number of times or a particular period of time within a particular time frame or window, the right to render on more than one rendering device, etc.

Once the authorization process is complete, media-key, RD-key I, PPCD-key II, and the authorized usage rights and restrictions, are encrypted with PPCD-key I at 114. Encrypted data is then transmitted to PPC device 104 at 116, and decrypted at 118. In general, PPCD-key I has been previously loaded into PPC device 104. In an embodiment, the first time of loading may occur during the manufacture phase or before the device is distributed to the user. PPC device 104 then replaces PPCD-key I for PPCD-key II at 120, and transmits an acknowledgement to PPC server 106 that the exchange has occurred at 122. Consequently, the next transmission between PPC server 106 and PPC device 104 may be encrypted with PPCD-key II.

PPC device 104 may then be transferred back to rendering device 102 from a computer (not shown) connected to PPC server 106, and verify usage rights and keys inside the device, at 323. Once the right to render is authorized, a first digital media data segment may then be requested from rendering device 102 at 124, and received in encrypted form at 126.

The first digital media data segment may then be decrypted with previously received media-key at 128, and subsequently encrypted with RD-key I at 134. In general, RD-key I has been previously loaded into rendering device 102. Encrypted first digital media data segment is then transmitted back to rendering device 102 at 136, where it is consequently decrypted and rendered at 138.

In addition, RD-key II, may be generated or obtained by PPC device 104 at 140, for use in a subsequent digital media data segment transmission. The RD-key II and a signature are then encrypted with RD-key I at 142. Signatures are generally a request for acknowledgement. In this case, the acknowledgement is that a previous RD-key (e.g., RD-key I, etc.) has been replaced with a subsequent RD-key (e.g., RD-key II, etc.).

Encrypted RD-key II and signature are then transmitted to rendering device 102 at 144, at which point RD-key I is replaced with RD-key II at 146. An acknowledgement to the signature is then transmitted to PPC device 104 at 148, signaling to PPC device 104 that RD-key II may be used. Consequently, PPC device 104 may verify the usage rights and keys inside the device at 149. Once the right to render is authorized, a second digital media data segment may be received at PPC device 104 at 150, decrypted with media-key at 152, and subsequently encrypted with RD-key II at 154. Encrypted second digital media segment may then be transmitted at 156 back to rendering device 102, where it may be decrypted and rendered at 158. In general, the authorized usage rights and restrictions may be checked inside the device periodically (e.g. every transmission, or every minute, etc) during the whole rendering process.

FIG. 3B shows a simplified method of securely distributing digital content with authorization verification and without a PPC server, according to an embodiment of the invention. As before, a rendering process 108 may be initiated at rendering device 102 with an attached PPC device 104. Once the media-ID and RD-ID are read at 110, PPC device 104 may verify the usage rights and keys inside the device at 391. Once the right to render is authorized, a first digital media data segment may then be requested from rendering device 102 at 124, and received in encrypted form at 126.

The first digital media data segment may then be decrypted with previously received media-key at 128, and subsequently encrypted with RD-key I at 134. In general, RD-key I has been previously loaded into rendering device 102. Encrypted first digital media data segment is then transmitted back to rendering device 102 at 136, where it is consequently decrypted and rendered at 138.

In addition, RD-key II, may be generated or obtained by PPC device 104 at 140, for use in a subsequent digital media data segment transmission. The RD-key II and a signature are then encrypted with RD-key I at 142. Signatures are generally a request for acknowledgement. In this case, the acknowledgement is that a previous RD-key (e.g., RD-key I, etc.) has been replaced with a subsequent RD-key (e.g., RD-key II, etc.).

Encrypted RD-key II and signature are then transmitted to rendering device 102 at 144, at which point RD-key I is replaced with RD-key II at 146. An acknowledgement to the signature is then transmitted to PPC device 104 at 148, signaling to PPC device 104 that RD-key II may be used. Consequently, PPC device 104 may verify the usage rights and keys inside the device at 149. Once the right to render is authorized, a second digital media data segment may be received at PPC device 104 at 150, decrypted with media-key at 152, and subsequently encrypted with RD-key II at 154. Encrypted second digital media segment may then be transmitted at 156 back to rendering device 102, where it may be decrypted and rendered at 158. In general, the authorized usage rights and restrictions may be checked inside the device periodically (e.g. every transmission, or every minute, etc) during the whole rendering process.

Figure 4A:
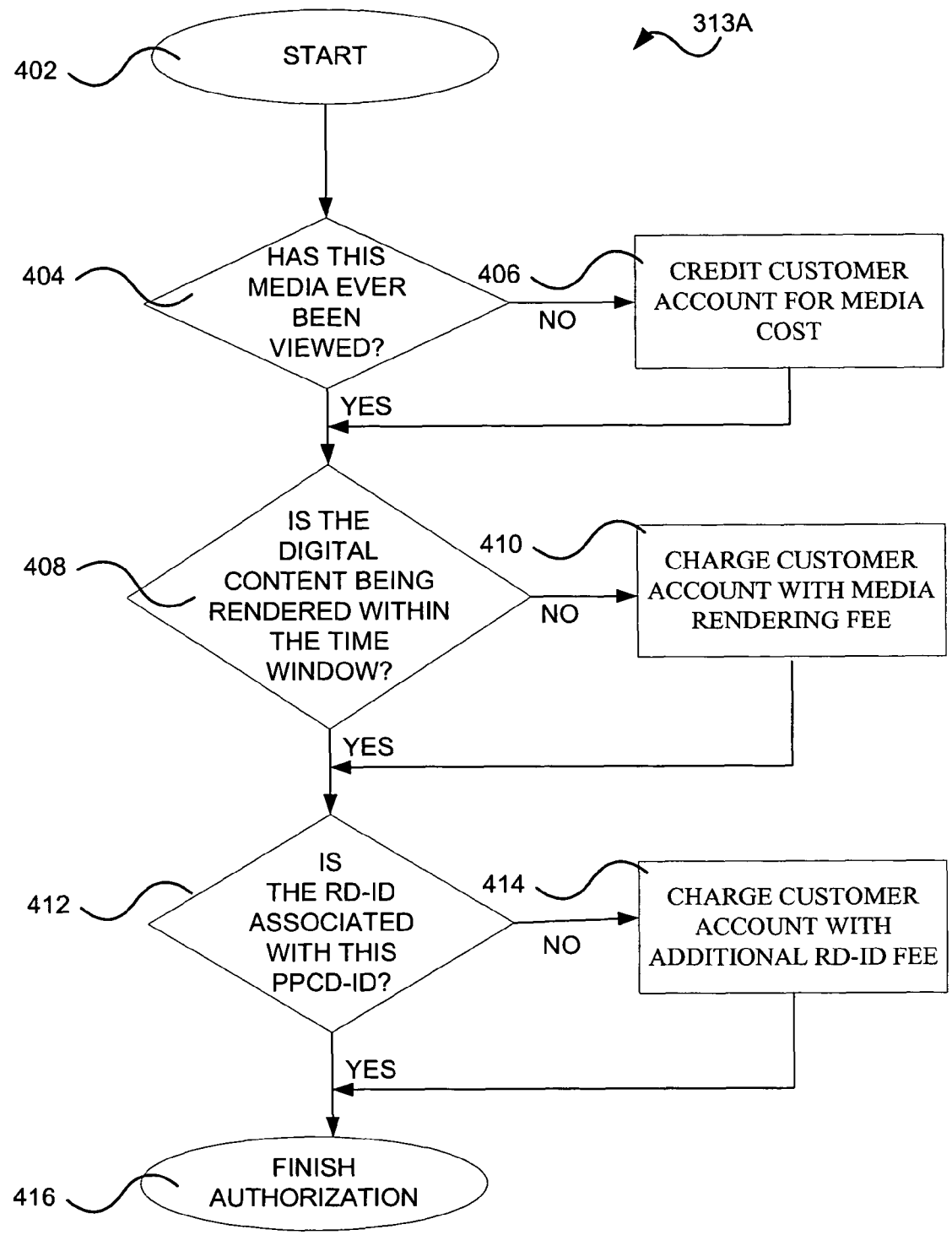
FIGS. 4A-B show simplified diagrams of a set of authorization processes as shown in FIGS. 3A-B, according to an embodiment of the invention.
Figure 4B:
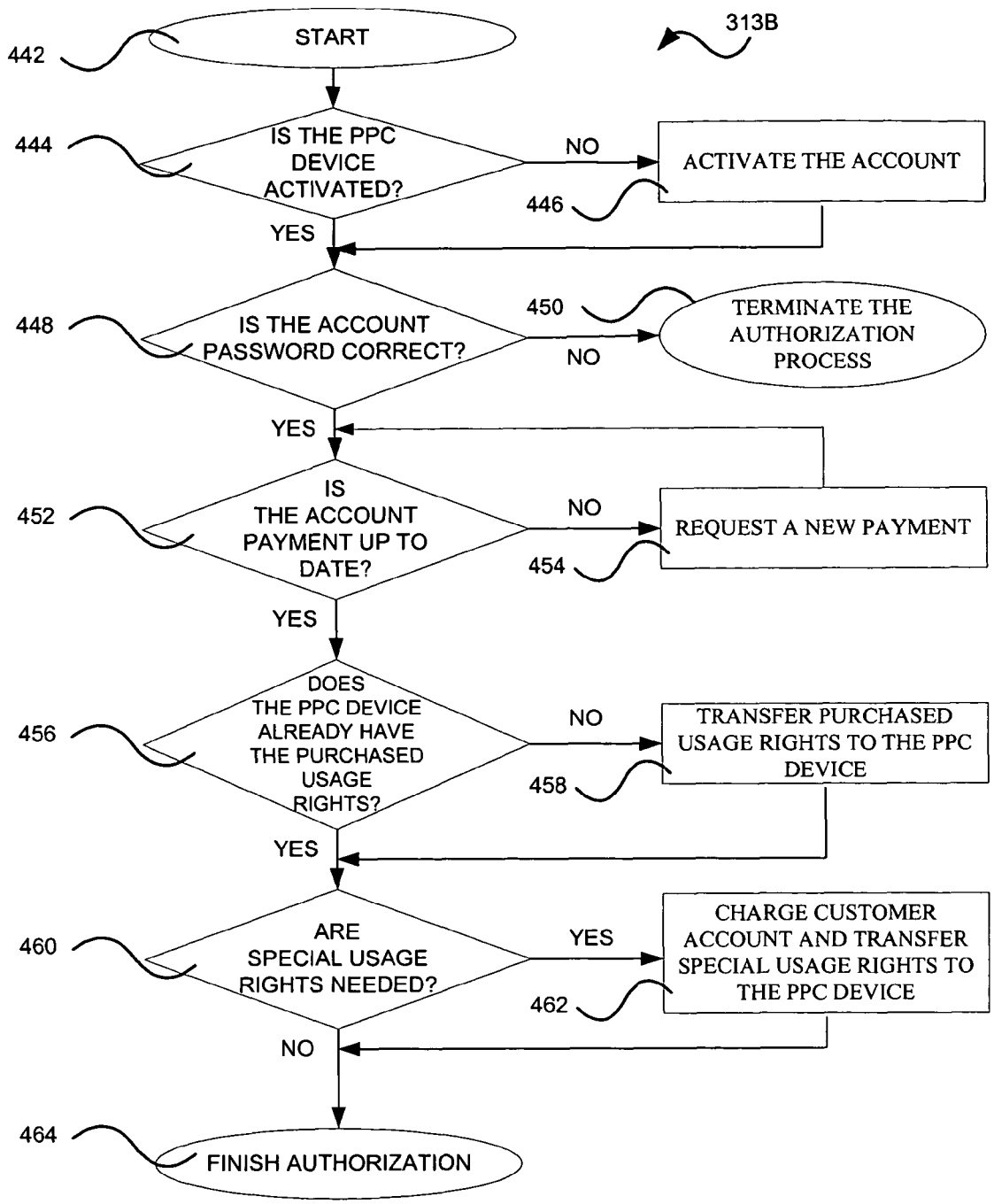

Referring now to FIGS. 4A-B, simplified diagrams of a set of authorization processes is shown, according to an embodiment of the invention. FIG. 4A shows a simplified diagram of an authorization process as shown in step 313a of FIG. 3A, according to an embodiment of the invention. As previously described, the owner of the digital media file may have created a set of usage rights and restrictions associated with rendering the digital media file, intending to charge consumers appropriate fees for those rights.

In general, the authorization process may start when a PPC device requests the media-key and/or a RD-key from PPC server. At step 404, PPC server may determine if this particular media, which is associated with its media-ID, has ever been viewed. If not, in order to subsidize distribution and copying, a customer account may be reimbursed for the purchase of the physical media (e.g., DVD, game disc, karaoke disk, etc.) on which the digital media content is stored. If this particular media has been viewed, then a media cost has already been credited, and no further reimbursement may be required.

Next at 408, PPC server determines if the digital content file is being rendered within the time window. That is, if the customer has purchased a two day time window, on the third day, a charge may be required. Likewise, if no time window has been purchased (e.g., an initial purchase, etc.), a charge may also be required. At 410, if required, the customer account is charged with a rendering fee.

Next at 412, PPC server determines if the RD-ID is associated with this PPCD-ID. That is, if the rendering device is permitted to be used on the account associated with the PPCD-ID. For example, a user may be granted permission to render the digital content file on three rendering devices. If a fourth device is used, an additional fee may be required. At 414, if required, the customer account may be charged with an additional RD-ID fee. Finally, at 416, the authorization process may be complete.

Referring now to FIG. 4B, a simplified diagram of an authorization process as shown in step 313b of FIG. 3A is shown, according to an embodiment of the invention. As before, the authorization process may start when a PPC device requests the media-key and/or a RD-key from PPC server. At step 444, PPCS determines if the PPCD is activated. If not, the PPCD is activated at 446. Next, the account password is checked at 448. If not, the authorization process may be terminated at 450. Next, the customer account is checked to ensure that payment status is up to date at 452. In not, the customer is requested to pay the appropriate amount at 454.

Next, the PPC server determines if the PPC device already has the purchased usage rights (such as the right to render one or several particular media or any media, for a particular number of times or a particular period of time, within a particular time frame or window, for a certain subscription fee, etc) at 456. If not, the purchased usage rights are transferred to the PPC device at 458 (through steps 114-118 as shown in FIG. 3A). Next, the PPC server determines if special usage rights are needed at 460. For example, additional charges or special rates may be required for new release games, special edition movies, a rendering device not yet granted permission, etc. If so, the customer account is charged and the special usage rights are subsequently transferred to the PPC device at 462 (through steps 114-118 as shown in FIG. 3A). In an embodiment of authorization process shown in FIG. 4B, a media-key is generally free for customer to download unless there is a special rate associated with it. The right to use the media-key is however limited by the purchased usage rights including the special usage rights. Finally, at 464, the authorization process may be complete.

Figure 5:
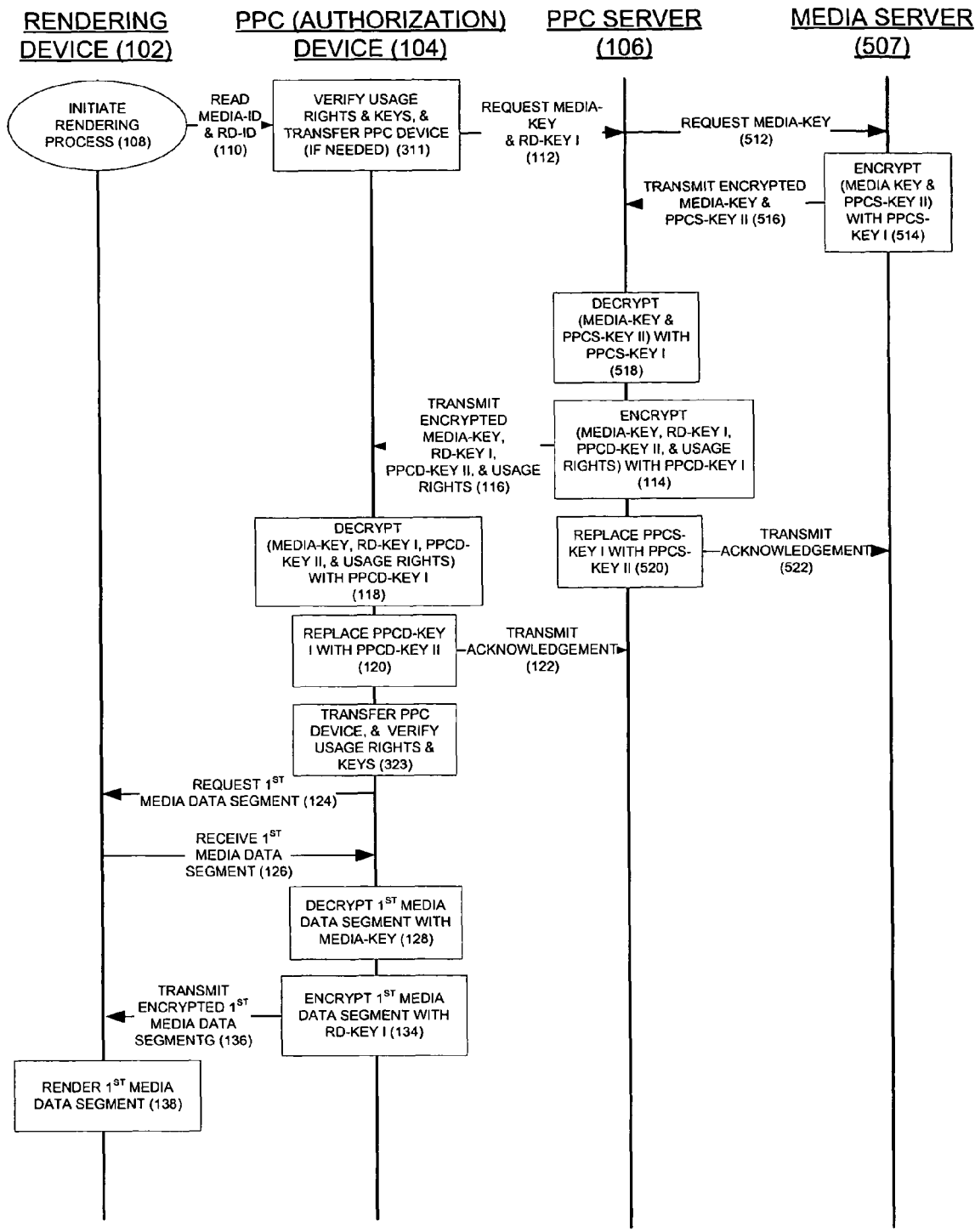
FIG. 5 shows a simplified method of securely distributing digital content with both a PPC server and a media server, according to an embodiment of the invention.

Referring now to FIG. 5, a simplified method of securely distributing digital content file with both a PPC server and a media server is shown, according to an embodiment of the invention. In general, in order to provide flexibility, media-keys, RD-keys, and PPCD-keys may be stored on different servers. In an embodiment, media-keys may be stored on a media server 507, while the RD-keys and PPCD-keys are stored on PPC server 106. For example, the digital content owner may wish to consolidate media keys that are used for several PPC servers 106 on a single media server 507. Likewise, media server 507 may be controlled by the digital content owner, whereas each PPC server 106 may be controlled by a channel partner or ISP (e.g., Comcast, Cingular, or any companies that provide the rendering service, etc.). The communication between servers may be secured by any state-or-the-art systems that are acceptable for e-commerce (such as transactions between banks, etc).

A rendering process 108 may be initiated at rendering device 102 with an attached PPC device 104. Once the media-ID and RD-ID are read at 110, PPC device 104 may verify usage rights and keys inside the device at 311. If the right to render is expired or not authorized, or keys (such as media-key and RD-key) are not inside the device, PPC device 104 may then be transferred from rendering device 102 and to a personal computer (not shown) connected to the Internet in order to communicate with PPC server 106.

PPC device 104 may then request the media-key, and RD-key I (if needed) at 112. PPC server 106, in turn, requests the media-key from media server 507 at 512. Media server 507 then encrypts the media key and PPCS-key II with PPCS-key I at 514. PPCS-key is generally used to securely encrypt the transmission between media server 507 and PPC server 106. Encrypted media-key and PPCS-key II are then transmitted to PPC server 106 at 516. PPC server 106, in turn, decrypts media-key and PPCS-key II at 518. PPC server 106 then encrypts RD-key I, media key, PPCD-key II, and the authorized usage rights and restrictions, with PPCD-key I at 114. Encrypted data are then transmitted to PPC device 104 at 116, and decrypted at 118.

In addition, PPC server 106 replaces PPCS-key I with PPCS-key II at 520, and an acknowledgement is sent at 522. Consequently, the next transmission between media server 507 and PPC server 106 may be encrypted with PPCS-key II. In general, PPC server 106 may request and obtain the media-key from media server 507 through any secure methods other than the scheme described above.

PPC device 104 then replaces PPCD-key I with PPCD-key II at 120, and transmits an acknowledgement to PPC server 106 at 122. Consequently, the next transmission between PPC server 106 and PPC device 104 may be encrypted with PPCD-key II.

PPC device 104 may then be transferred back to rendering device 102 from a computer (not shown) connected to PPC server 106, and verify usage rights and keys inside the device, at 323. Once the right to render is authorized, a first digital media data segment may then be requested from rendering device 102 at 124, and received in encrypted form at 126.

The first digital media data segment may then be decrypted with previously received media-key at 128, and subsequently encrypted with RD-key I at 134. Encrypted first digital media data segment is then transmitted back to rendering device 102 at 136, where it is consequently decrypted and rendered at 138.

Figure 6:
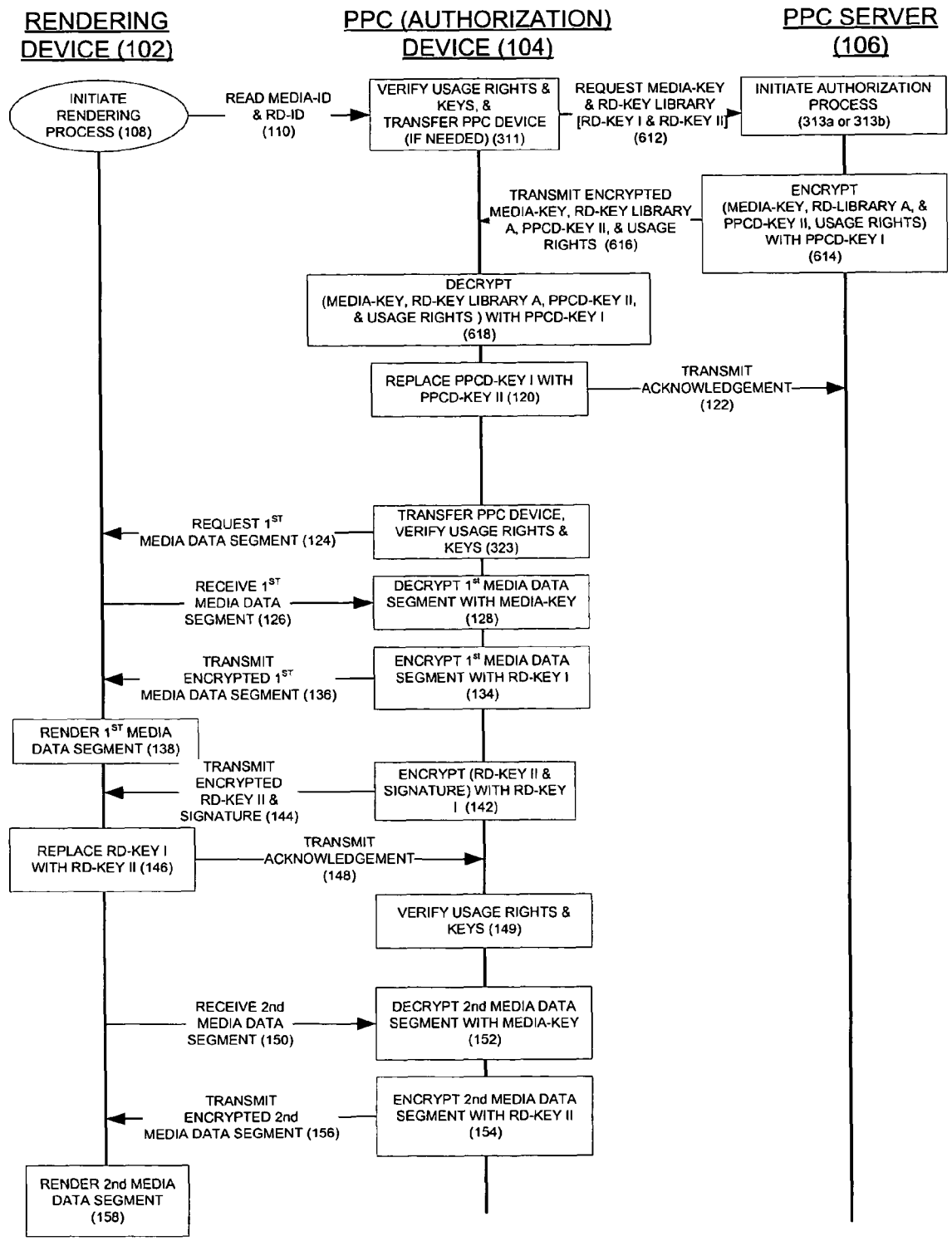
FIG. 6 shows a simplified method of securely distributing digital content with a key library according to an embodiment of the invention.

Referring now to FIG. 6, a simplified method of securely distributing digital content with a key library is shown, according to an embodiment of the invention. In general, it may be advantageous to have PPC server 106 generate a RD-key library instead of having PPC device 104 create each RD-key. For example, key generation may be beyond the processing capability of PPC device 104. It may subsequently affect the rendering performance of rendering device 102. The more important reason to use a RD key library is that the PPC server 106 can then easily find out the current RD-key (e.g. via a RD-key-ID, etc) of each rendering device. When other PPC devices try to couple with the rendering device 102, the PPC devices can read the RD-ID and RD-key-ID for the rendering device 102 and find out the exact current RD-key from the PPC server 106. If RD-key is generated by PPC device 104, both PPC server 106 and other PPC devices will rely on PPC device 104 to find out the current RD-key, which is often inconvenient especially when PPC device 104 is lost.

A rendering process 108 may be initiated at rendering device 102 with an attached PPC device 104. Once the media-ID and RD-ID are read at 110, PPC device 104 may verify usage rights and keys inside the device at 311. If the right to render is expired or not authorized, or keys (such as media-key and RD-key) are not inside the device, PPC device 104 may then be transferred from rendering device 102 and to a personal computer (not shown) connected to the Internet in order to communicate with PPC server 106.

PPC device 104 may then request the media-key, and RD-key library A (including RD-key I, RD-key II, etc.) if needed, at 612. Before the media-key and RD-key library A are transmitted to PPC device 104, an authorization process may be initiated by PPC server 106 at 313a or alternatively at 313b. Once the authorization process is complete, media-key, RD-key library A, PPCD-key II, and the authorized usage rights and restrictions, are encrypted with PPCD-key I at 614. Encrypted data is then transmitted to PPC device 104 at 616, and decrypted at 618. In general, PPCD-key has been previously loaded into PPC device 104. PPC device 104 then replaces PPCD-key I for PPCD-key II at 120, and transmits an acknowledgement to PPC server 106 that the exchange has occurred at 122.

PPC device 104 may then be transferred back to rendering device 102 from a computer (not shown) connected to PPC server 106, and verify usage rights and keys inside the device, at 323. Once the right to render is authorized, a first digital media data segment may then be requested from rendering device 102 at 124, and received in encrypted form at 126.

The first digital media data segment may then be decrypted with previously received media-key at 128, and subsequently encrypted with RD-key I at 134. In general, RD-key I has been previously loaded into rendering device 102. Encrypted first digital media data segment is then transmitted back to rendering device 102 at 136, where it is consequently decrypted and rendered at 138.

The RD-key II and a signature are then encrypted with RD-key I at 142. Signatures are generally a request for acknowledgement. In this case, the acknowledgement is that a previous RD-key (e.g., RD-key I, etc.) has been replaced with a subsequent RD-key (e.g., RD-key II, etc.).

Encrypted RD-key II and signature are then transmitted to rendering device 102 at 144, at which point RD-key I is replaced with RD-key II at 146. An acknowledgement to the signature is then transmitted to PPC device 104 at 148, signaling to PPC device 104 that RD-key II may be used. Consequently, At 149, PPC device 104 may again verify the usage rights and keys inside the device. Once the right to render is authorized, a second digital media data segment may be received at PPC device 104 at 150, decrypted with media-key at 152, and subsequently encrypted with RD-key II at 154. Encrypted second digital media segment may then transmitted at 156 back to rendering device 102, where it may be decrypted and rendered at 158. Once RD-key library A is consumed, the user may be notified to communicate with PPC server 106 in order to receive a new key library (e.g., RD-key library B, etc.).

Figure 7:
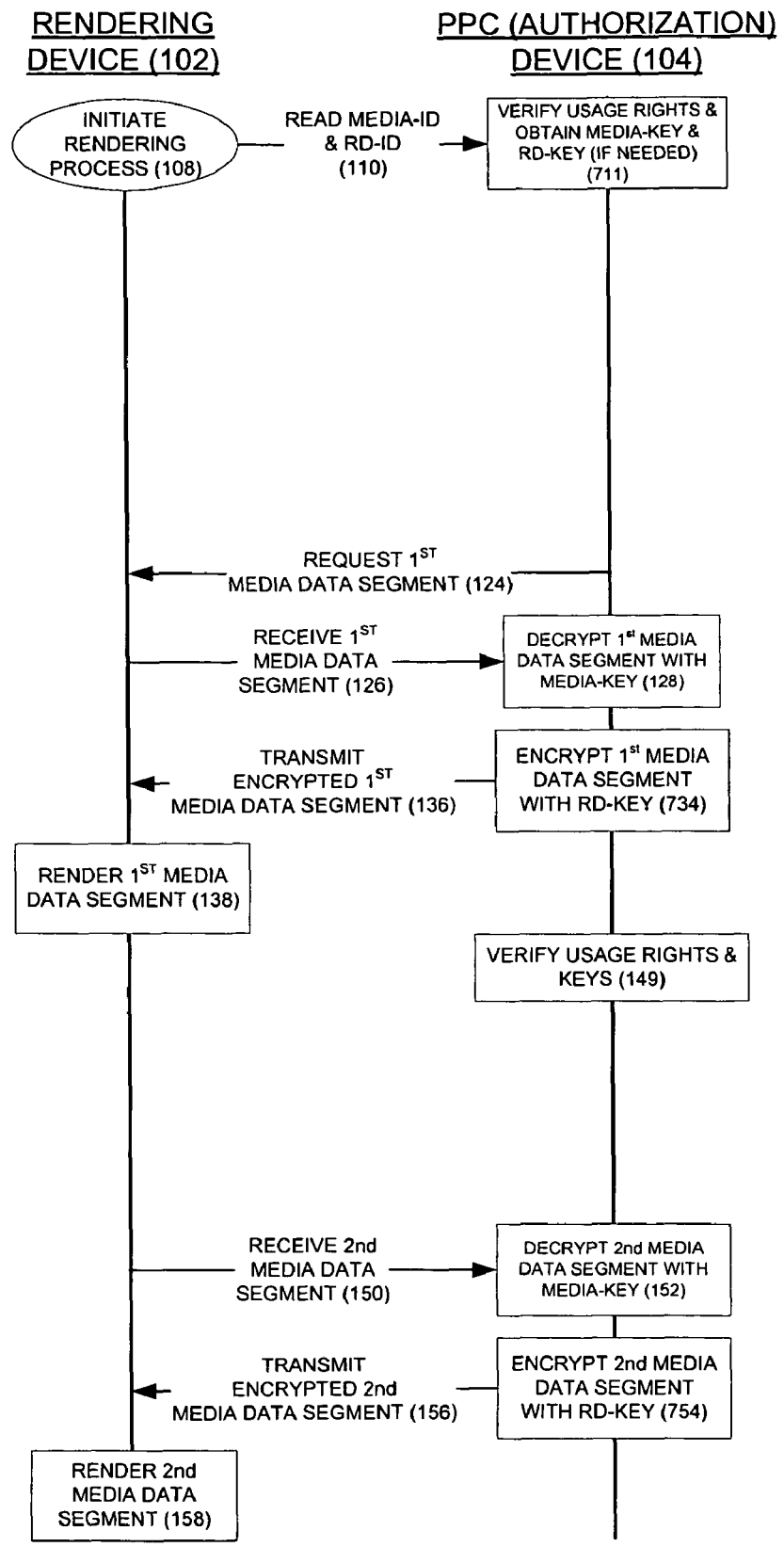
FIG. 7 shows a simplified method of securely distributing digital content with a single RD-key, according to an embodiment of the invention.

Referring now to FIG. 7, a simplified method of securely distributing digital content with a single RD-key is shown, according to an embodiment of the invention. One of the main advantageous to have single RD-key is the design of PPC device may be simplified and the manufacture cost may be reduced. PPC device does not have to either generate RD-key by itself, or need to store RD-key library and keep track of current RD-key. The requirements on rendering device and PPC server may be reduced as well. The tradeoff is that the security level may be compromised to some extent. The transmission (e.g., between PPC device and rendering device, etc) may not be history-sensitive any more although it is still content-sensitive. Noise data (e.g., real time clock, etc) may be patched on the intent-to-transmit data to realize the history-sensitivities of transmission. Nevertheless, a fixed RD-key may be relatively vulnerable to attack. In an embodiment, this scheme may be applied on data considered less critical. For example, the digital content file may have limited economic value, such as a demo or trailer, and hence the cost of piracy may be minimal.

As before, a rendering process 108 may be initiated at rendering device 102 with an attached PPC device 104. Once the media-ID and RD-ID are read at 110, PPC device 104 may verify usage rights and keys inside the device at 711. If the right to render is expired or not authorized, or keys (such as media-key and RD-key) are not inside the device, PPC device may obtain media-key, RD-keys, next PPCD-key, as well as the authorized usage rights and restrictions, if needed, from PPC server [not shown]. Once the right to render is authorized, a first digital media data segment may then be requested from rendering device 102 at 124, and received in encrypted form at 126.

The first digital media data segment may then be decrypted with media-key stored on PPC device 104 at 128, and subsequently encrypted with RD-key at 734. In general, RD-key may be a universal RD-key that may be used on multiple rendering devices 102. Encrypted first digital media data segment is then transmitted back to rendering device 102 at 136, where it is consequently decrypted and rendered at 138.

Consequently, at 149, PPC device 104 may verify the usage rights and keys inside the device. Once the right to render is authorized, a second digital media data segment may be received at PPC device 104 at 150, decrypted with media-key at 152, and subsequently encrypted with RD-key at 754. Encrypted second digital media segment may then transmitted at 156 back to rendering device 102, where it may be decrypted and rendered at 158.

While this invention has been described in terms of several preferred embodiments, there are alterations, permutations, and equivalents, which fall within the scope of this invention. It should also be noted that there are many alternative ways of implementing the methods and apparatuses of the present invention. Although various examples are provided herein, it is intended that these examples be illustrative and not limiting with respect to the invention. Further, the abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention For example, all the transmission schemes in this invention may be applied on any transmission between any parties, not limited to parties described in this invention, as deemed appropriate. For another example, each of the cryptographic "keys" (such as media-key, RD-key, PPCD-key, PPCS-key, etc) used in this invention may consist of multiple keys (e.g., two keys, five keys, etc) that stored separately. The data may then be encrypted sequentially with these keys one after the other. In such case, even if one key is compromised, the transmitted data may still be substantially safe. For yet another example, when a cryptographic key (such as media-key, RD-key, PPCD-key, PPCS-key, etc) is transmitted, it may be in a form of certain code during the transmission, instead of the actual key itself. That is, the sender (such as PPC server) only transmits out an encrypted code, which can be used to derive the actual key inside the receiver (such as PPC device). The code may be an identity of the key, a program to generate the key, or an instruction to find or generate the key, or even the key itself. The word "derive" may be involving in identifying, generating, finding, decrypting, encrypting, or simply copying, etc. The same scheme may also apply to the transmission of a set of keys or a key library, etc.

In yet another example, each of the rendering device, the PPC device, and the PPC server, may itself have a backup key, such that if the primary key (e.g., PPCS-key, PPCD-key, RD-key, etc.) becomes corrupted, the backup key may be used to restore communication. In yet another example, each of the rendering device, the PPC device, and the PPC server, may store both the previous and the current keys (e.g., PPCS-key, PPCD-key, RD-key, etc.) until the next round of communication. In case the synchronic process of updating the key is disrupted, the previous key may be used to restore communication.

In yet another example, all schemes described in this invention may be dramatically simplified by removing the encryption step at 134, 154, 734, and 754 if applied, although the security level may be compromised to some extent. The RD-keys are then not needed.

Advantages of the invention include a method for secure digital content distribution. Additional advantages include the ability to control the purchase and use of digital content, such that content owners are fairly compensated without discouraging buyers from purchasing the digital content. Furthermore, the term set as used herein includes one or more of the named element of the set. For example, a set of "X" refers to one or more "X."

Having disclosed exemplary embodiments and the best mode, modifications and variations may be made to the disclosed embodiments while remaining within the subject and spirit of the invention as defined by the following claims.

What is claimed is:

1. A method of transmitting a first digital content file from a first sender device configured with a first key library to a receiver device configured with a receiver ID and a first set of sender-receiver keys, comprising:
   identifying said first set of sender-receiver keys within said first key library based on said receiver ID;
   encrypting a first digital message, said first digital message including said first digital content file and a code to derive a second set of sender-receiver keys, with said first set of sender-receiver keys;
   transmitting said first digital message to said receiver device;
   decrypting said first digital message with said first set of sender-receiver keys;
   deriving said second set of sender-receiver keys based on said code;
   replacing said first set of sender-receiver keys with said second set of sender-receiver keys.

2. The method of claim 1, wherein said receiver device is programmed to store said first set of sender-receiver keys at least until said second set of sender-receiver keys is replaced.

3. The method of claim 1, wherein said receiver device is configured with a backup set of sender-receiver keys.

4. The method of claim 1, wherein said receiver device is programmed to decrypt a second digital message from a second sender device with a fourth set of sender-receiver keys.

5. The method of claim 1, wherein said digital content file includes a second key library.

6. The method of claim 1, wherein at least one of said first sender device and said receiver device includes a substantially tamper resistant PPC configured with at least a CPU/Memory and an encryption/decryption engine.

7. A method of rendering a digital content file substantially in real time on a rendering device coupled to an authorization device, wherein said digital content file is encrypted with a set of cryptographic media keys, comprising:
   receiving a first segment of said digital content file on said authorization device;
   decrypting said first segment of said digital content file with at least one cryptographic media key of said set of cryptographic media keys in said authorization device;
   transmitting a first rendering message, including said first segment of said digital content file, to a rendering device;
   rendering said first segment of said digital content file; and
   verifying a set of usage rights, prior to said step of receiving a first segment of said digital content file on said authorization device, wherein said set of usage rights includes at least one of a right to render a particular set of digital content files, a right to render on a particular set of rendering devices, a right to render within a particular time frame, a right to render for a particular period of time, and a right to render for a particular number of times.

8. The method of claim 7, wherein at least one said set of cryptographic media keys and said set of usage rights is obtained from an authorization server.

9. The method of claim 7, wherein at least one of said set of cryptographic media keys and said set of usage rights is authorized by the payment of a fee.

10. A method of rendering a digital content file on a rendering device coupled to an authorization device, comprising:
    receiving a first segment of said digital content file on said authorization device;
    decrypting said first segment of said digital content file in said authorization device with at least one cryptographic media key of a set of cryptographic media keys;
    encrypting a first rendering message, including said first segment of said digital content file, with a first set of rendering device cryptographic keys, in said authorization device;
    transmitting said first rendering message to said rendering device;
    decrypting said first rendering message with said first set of rendering device cryptographic keys in said rendering device;
    rendering said first segment of said digital content file on said rendering device; and
    deriving a second set of rendering device cryptographic keys from a first code included in said first rendering message, after said step of decrypting said first rendering message with said first set of rendering device cryptographic keys in said rendering device.

11. The method of claim 10, wherein said rendering device is programmed to store said first set of rendering device cryptographic keys at least until a third set of rendering device cryptographic keys is derived from a second code included in a second rendering message.

12. The method of claim 10, further including the step of verifying a set of usage rights, prior to said step of receiving a first segment of said digital content file on said authorization device, wherein said set of usage rights includes at least one of a right to render a particular set of digital content files, a right to render on a particular set of rendering devices, a right to render within a particular time frame, and a right to render for particular period of time, and a right to render for a particular number of times.

13. The method of claim 12, wherein at least one of said set of cryptographic media keys and said set of usage rights, is obtained from an authorization server.

14. The method of claim 12, wherein at least one of said set of cryptographic media keys and said set of usage rights, is authorized by the payment of a fee.

15. An apparatus for rendering a digital content file substantially in real time on a rendering device coupled to an authorization device, comprising:
- means for receiving a first segment of said digital content file on said authorization device;
- means for decrypting said first segment of said digital content file in said authorization device with at least one cryptographic media key of a set of cryptographic media keys;
- means for transmitting said first rendering message to said rendering device;
- means for rendering said first segment of said digital content file on said rendering device; and
- a program module to verify a set of usage rights, wherein said set of usage rights includes at least one of a right to render a particular set of digital content files, a right to render on a particular set of rendering devices, a right to render within a particular time frame, a right to render for a particular period of time, and a right to render for a particular number of times.

16. The apparatus of claim 15, further including means for obtaining at least one of said set of cryptographic media keys and said set of usage rights from an authorization server.

17. The apparatus of claim 15, further including means for authorizing at least one of said first set of cryptographic media keys and said set of usage rights, by the payment of a fee.

18. The apparatus of claim 15 further including means for rendering said digital content file substantially in real time, at a bit rate of at least one megabytes per second.

19. An apparatus for rendering a digital content file encrypted with a set of cryptographic media keys on a rendering device coupled to an authorization device, said rendering device including a first set or rendering device cryptographic keys, comprising:
- means for receiving a first segment of said digital content file on said authorization device;
- means for decrypting said first segment of said digital content file in said authorization device with at least one cryptographic media key of said set of cryptographic media keys;
- means for encrypting a first rendering message, including said first segment of said digital content file, with said first set of rendering device cryptographic keys, in said authorization device;
- means for transmitting said first rendering message to said rendering device;
- means for decrypting said first rendering message with said first set of rendering device cryptographic keys;
- means for rendering said first segment of said digital content file on said rendering device; and
- a program module to derive a second set of rendering device Cryptographic keys from a first code included in said first rendering message,
- wherein said rendering device is programmed to store said first set of rendering device cryptographic keys at least until a third set of rendering device cryptographic keys is derived from a second code included in a second rendering message.

20. The apparatus of claim 19, further including means for verifying a set of usage rights, wherein said set of usage rights includes at least one of a right to render a particular set of digital content files, a right to render on a particular set of rendering devices, a right to render within a particular time frame, and a right to render for particular period of time, and a right to render for a particular number of times.

21. The apparatus of claim 20, further including means for obtaining at least one of said set of cryptographic media keys and said set of usage rights from an authorization server.

22. The apparatus of claim 20, further including means for authorizing at least one of said set of cryptographic media keys and said set of usage rights, by the payment of a fee.

23. The apparatus of claim 20, further including means for rendering said digital content file substantially in real time, at a bit rate of at least one megabytes per second.

24. The apparatus of claim 19, further including
- a second program module to verify a set of usage rights;
- a third program module to obtain at least one of said set of cryptographic media keys and said set of usage rights from an authorization server;
- a fourth program module to authorize at least one of said set of cryptographic media keys and said set of usage rights, by a payment of a fee;
- a fifth program module to render said digital content file substantially in real time, at a bit rate of at least one megabytes per second;
- a sixth program module to configure at least one cryptographic media key of said set of cryptographic media keys as at least one of a symmetric-key, an AES key, a DES key, Triple DES key, a Lucifer key, a Blowfish key, a CAST key, an IDEA key, a RC5 key, and a RC2 key;
- a seventh program module to configure at least one rendering device cryptographic key of said first set of rendering device cryptographic keys as at least one of a symmetric-key, an AES key, a DES key, Triple DES key, a Lucifer key, a Blowfish key, a CAST key, an IDEA key, a RC5 key, and a RC2 key;
- a eighth program module to configure at least one of said rendering device and said authorization device with a substantially tamper resistant PPC configured with at least a CPU/Memory and an encryption/decryption engine; and
- a ninth program said PPC with at least a CPU/Memory and an encryption/decryption engine;
- wherein said rendering device is one of a digital media player, a DVD player, a HD DVD player, 4 gaming console, a digital music player, a digital book reader, a karaoke machine, a TV, a HD TV, and a computer.

* * * * *